United States Patent [19]

Masak

[11] 3,932,818
[45] Jan. 13, 1976

[54] SPECTRUM NOTCHER
[75] Inventor: Raymond J. Masak, East Northport, N.Y.
[73] Assignee: Hazeltine Corporation, Greenlawn, N.Y.
[22] Filed: July 18, 1974
[21] Appl. No.: 489,623

[52] U.S. Cl. ............... 328/167; 325/323; 325/476; 328/165; 330/149
[51] Int. Cl.² ......................................... H04B 15/00
[58] Field of Search ............ 328/165, 167; 325/323, 325/476; 330/149

[56] References Cited
UNITED STATES PATENTS
3,213,450  10/1965  Goor ............................ 325/476
3,810,067  5/1974  Heidecker ..................... 328/167

FOREIGN PATENTS OR APPLICATIONS
1,111,863  5/1968  United Kingdom ............... 328/167

*Primary Examiner*—John Kominski

[57] ABSTRACT

Disclosed is an adaptive filter for suppressing interfering narrow-band signals in a composite signal containing a desired broad-band signal. The adaptive filter is useful in a system which uses a broad-band signal and signal processing apparatus to derive information from the broad-band signal. In one embodiment the system makes use of a delay line to provide a delayed replica of the composite signal which is used to provide a correction signal to cancel the interfering narrow-band signal. The desired broad-band signal is not canceled by the adaptive filter.

8 Claims, 6 Drawing Figures

SPECTRUM NOTCHER

BACKGROUND OF THE INVENTION

The present invention relates to systems for receiving broad-band signals and, in particular, to an adaptive filter for suppressing narrow-band interference in such systems.

Modern communications and radar systems often use a broad-band signal format for transmission of information or for the radar function. By phase coding or frequency hopping the transmitted signal it is possible to spread the transmitted energy over a bandwith much larger than required by the modulation content of the signal. Since the effectiveness of the communications link is determined by the total amount of energy in the transmitted signal, it is possible to use a broad-band signal, wherein the total energy is spread over a large frequency band, to limit the amount of energy at any particular frequency and thereby obtain a communications signal which is largely indistinguishable from background noise.

Such broad-band signals are also useful to eliminate mutual interference between signals in a communications system, such as the one described in Grossman's U.S. Pat. No. 3,714,573 entitled "Spread-Spectrum Position Monitoring System," which is assigned to the same assignee as the present application.

In a radar system it is desirable to use a large amount of energy for target detection. By use of a spread-spectrum transmitted signal the total energy may be spread in time as well as in frequency, thereby eliminating the need for a high peak power pulse which may cause breakdown in the radar transmitting equipment. Upon reception the spread-spectrum signal may be compressed in time to form an output pulse which would be equivalent to a radar pulse of higher peak power than actually used in the transmitter. The most common form of spread-spectrum signal used in radar systems probably is the frequency modulated "chirp" pulse. In this type of system a signal is transmitted which varies in frequency from the beginning of the pulse to the end of the pulse. Upon reception this frequency variation is used in a pulse compression filter to achieve a high energy pulse of relatively short duration.

In both radar and communications systems phase modulation may be used to achieve a spread-spectrum signal. In a phase-modulated, spread-spectrum system the transmitted signal is rapidly switched in phase to produce a signal which has a wide frequency band. Upon reception the signal is sampled by a "matched filter" which decodes the transmitted signal and developes a short output pulse in response to the correct phase coded signal. The matched filter provides no output for an incorrectly coded or uncoded signal.

In any of the above-described systems, or similar systems which utilize a broad-band signal, narrow-band signals, such as CW or narrow-band FM can interfere with proper system operation. The high signal level of such narrow-band signals, compared to the noise-like broad-band, desired signal, can cause the narrow-band signal to activate an automatic gain control circuit in the receiver, thereby suppressing the desired broad-band signal.

SUMMARY OF THE INVENTION

It is therefore an object of the present invention to provide an adaptive filter for suppressing interference by narrow-band signals in a system for receiving a desired broad-band signal.

It is a further object of the present invention to provide such a filter wherein the interfering signal is substantially canceled by a time-delayed replica of the received signal.

In accordance with the present invention there is provided an adaptive filter for suppressing an interfering narrow-band signal in a composite signal containing a desired broad-band signal. The adaptive filter includes means, responsive to supplied signals, for combining the signals to form an output signal. There is further provided means for supplying the composite signal to the combining means and means responsive to the composite signal for providing a delayed replica of the composite signal. Finally there is provided means, jointly responsive to the delayed replica and to the output signal for developing a correction signal and for supplying the correction signal to the combining means to cause suppression of the interfering narrow-band signal in the output signal.

For a better understanding of the present invention, together with other and further objects thereof, reference is had to the following description taken in conjunction with the accompanying drawings, and its scope will be pointed out in the appended claims.

DESCRIPTION AND OPERATION OF THE EMBODIMENT OF FIG. 1

Figure 1:
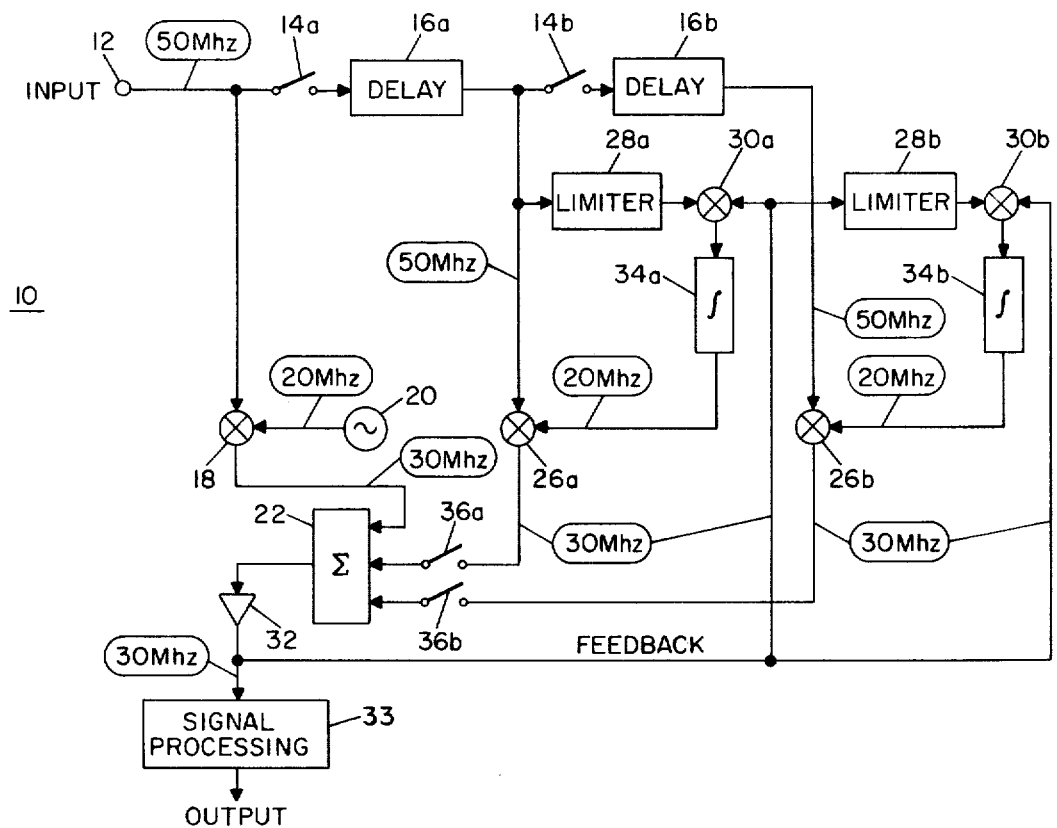
FIG. 1 is a simplified block diagram of an adaptive filter constructed in accordance with present invention.

FIG. 1 is a simplified block diagram of an adaptive filter 10 constructed in accordance with the present invention. For purposes of illustration, adaptive filter 10 is shown operating at a convenient intermediate frequency (IF) and as including a conversion between an input frequency of 50 MHz and an output frequency of 30 MHz. Signals supplied to adaptive filter 10 by input 12 are supplied to mixer 18 which is also supplied from local oscillator 20 with a suitable local oscillator signal at 20 MHz. The output of mixer 18 is supplied to combiner 22 and thereafter to output amplifier 32 and output signal processor 33. At mixer 18 the supplied output signal is converted from an input IF frequency of 50 MHz to the output IF frequency of 30 MHz. It will be evident to those skilled in the art that other convenient IF frequencies may be used and that other conventional components not illustrated, such as amplifiers and filters, may be included in the circuit.

The signal from input 12 is also supplied by switch 14a to delay means 16a. The output of delay means 16a is a delayed replica of the signal supplied to input 12. The delay period $\tau$ of means 16a is generally selected to be the inverse of the bandwidth of a supplied desired signal as will be further explained below. The delayed replica of the input signal is supplied to limiter 28a and mixer 26a. Mixer 30a is also provided with a sample of the output of combiner 22 and amplifier 32. The output of mixer 30a is a control signal which is supplied by integrating circuit 34a to mixer 26a. The combination of the delayed replica of the input signal supplied to mixer 26a and the integrated control signal supplied to mixer 26a forms a correction signal which is supplied to summer 22 by switch 36a.

Adaptive filter 10 also includes delay means 16b, limiter 28b, integrator 34b, and mixers 26b and 30b which are connected by switches 14b and 36b in a similar manner to the output of delay means 16a and summer 22. It will be recognized that switches 14a, 14b, 36a and 36b are not required in the adaptive filter 10, but have been included to facilitate explanation of the operation of the adaptive filter 10. Illustrated in FIG. 1 is also signal processing means 33 which is not a part of adaptive filter 10. Signal processing means 33 is to be selected in accordance with the particular type of broad-band signal being used and is shown in FIG. 1 to facilitate explanation of the operation of adaptive filter 10.

Figure 3A:
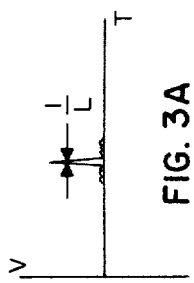
FIG. 3 is an illustration of the time response of the signal processing means in FIG. 1 to the signals illustrated in FIG. 2.
Figure 2A:
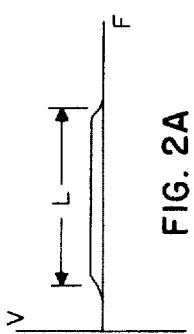
FIG. 2 is an illustration of the frequency spectra of signals occurring in the embodiment of FIG. 1.

FIG. 2A illustrates the spectral properties of a broad-band signal which may be used in connection with the present invention. The broad-band signal of FIG. 2A has a bandwidth L which may typically be as much as 50 MHz. This signal, by reason of its extremely broad bandwidth, is usually not easily detected without apriori knowledge of the signal format because the total energy contained in the signal is spread over a broad range of frequencies and consequently the signal itself resembles background noise. This signal may typically be formed by rapid frequency changing of the transmitted signal or rapid phase change of the transmitted signal. Detection of such a broad-band, spreadspectrum signal is facilitated by use of signal processing means 33 of FIG. 1 commonly known as a "matched filter." The matched filter may in some cases include a delay line which has taps associated with known phase change intervals in the spread-spectrum code. The output of the signal processing means 33 in response to the desired signal of FIG. 2A is illustrated in FIG. 3A. Signal processing means 33 causes the spread spectrum signal of FIG. 2A to be compressed in time and results in a relatively short duration output pulse having a pulse width which is typically the reciprocal of the signal bandwidth L.

Figure 2B:
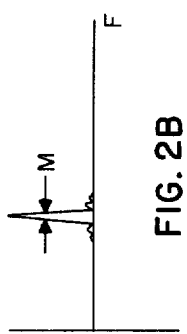

FIG. 2b illustrates a narrow-band signal having a high peak energy. This is typical of a narrow-band FM or CW signal having a relatively narrow bandwidth M. When such a signal is applied to signal processing means 33 the resulting output is a noise-like signal caused by the decoding action of signal processing means 33. Since the narrow-band signal of FIG. 2B does not correlate with the signal code for which signal processing means 33 is designed the resulting output is merely noise.

Figure 3B:
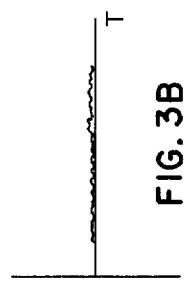
Figure 3C:
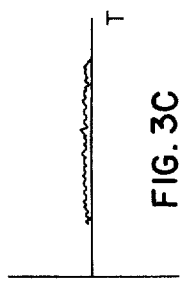
Figure 2C:
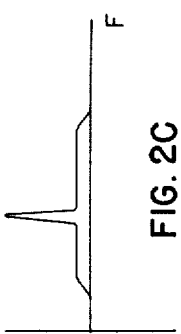

FIG. 2C illustrates the spectral response of a composite signal which includes the broad-band desired signal of FIG. 2A and the narrow-band signal of FIG. 2B. Because the relatively high peak value, narrow-band signal of FIG. 2B tends to cause activation of automatic gain control circuits usually found in signal processing means 33, there tends to be a suppression of the desired broad-band signal in signal processing means 33 and the resulting output signal illustrated in FIG. 3C is primarily representative of the narrow-band interference signal and has the same noise-like characteristic as the output illustrated in FIG. 3B.

Referring to FIG. 1 it will be seen that with switches 14a, 14b, 36a and 36b in the open position the adaptive filter 10 behaves similar to a conventional IF receiver stage. Signals supplied to input terminal 12 are provided to combiner 22 after frequency conversion in mixer 18. The output of combiner 22 is provided by amplifier 32 to signal processing unit 33. All signals supplied to input port 12 are provided in similar form to signal processing means 33 except for a change in IF frequency, for example, as illustrated from 50 to 30 MHz.

When switches 14a and 36a are closed, the adaptive fiter 10 contains a single adaptive loop. When only the desired signal of FIG. 2A is applied at input 12 of the adaptive filter, there is little effect on the output signal as a result of the presence of the adaptive loop. The supplied signal is provided to combiner 22 by mixer 18 following frequency conversion. Delay means 16a supplies a delayed replica of the supplied signal to mixer 26a and mixer 30a by way of limiter 28a. At mixer 30a the delayed replica is mixed with the output signal, representing the undelayed supplied signal. Since the delayed replica has undergone a delay of $\tau$, the inverse of the bandwidth of the supplied signal, there is no correlation between the signals supplied to mixer 30 and the resulting output control signal is a noise-like signal which is substantially eliminated by integrating circuit 34a. The control signal supplied to mixer 26a is therefore very weak, and mixer 26a supplies substantially no output correction signal to combiner 22.

When the signal supplied to input 12 is a composite, such as illustrated in FIG. 2C, containing both the desired broad-band signal and an intefering narrow-band signal, the adaptive loop of adaptive filter 10 acts to cause suppression of the interfering narrow-band signal in the output signal. In this case, the composite signal is supplied to combiner 22 and to delay means 16a. The output of means 16a is a delayed replica of the composite signal which is supplied to mixer 26a and mixer 30a by limiter 28a. Also supplied to mixer 30a is a sample of the output signal from combiner 22 which initially comprises the originally supplied composite signal. In mixer 30a there is a correlation between the narrow-band interfering signal in the originally supplied composite signal and the narrow-band interfering signal in the delayed replica which causes an output signal from mixer 30a at the frequency of local oscillator 20. This output is representative of the phase and amplitude of the interfering signal component in the output signal with respect to the phase and amplitude of the interfering signal component in the limited delayed replica supplied to mixer 30a. The output of mixer 30a is integrated by integrator 34a to form a control signal. Integrator 34a is typically a narrow-band filter and its bandwidth is determined by the desired response time of the adaptive filter. The bandwidth of integrator 34c does not limit the bandwidth of the interfering signal to be suppressed, but merely determines the response time of the adaptive filter 10. The output of integrator 34a is a control signal, which is developed by limiter 28a, mixer 30a and integrator 34a in response to the delayed replica of the composite signal and the output of combiner 22. The control signal and delayed replica are combined in mixer 26a. The control signal supplied by integrator 34a modulates the delayed replica of the composite signal in mixer 26a to form a correction signal. Since the control signal is representative of the phase and amplitude of the narrow-band interfering signal component in the output signal with respect to the narrow-band component in the delayed replica, the resulting correction signal is suitable for canceling the interfering signal in the output at combiner 22. It will be evident to those skilled in the art that the phase between the delayed replica and output signals supplied to mixer 30a may require adjustment to achieve the correct phase reference for the correction signal to cause cancellation of the interfering signal at combiner 22.

Since mixer 30a provides an output signal which is the product of the delayed replica of the input signal and the sampled output of amplifier 32, it will be evident that the output control signal of mixer 30a will be proportionate to the square of the narrow-band interfering signal supplied at input port 12. In order to provide a system having a more linear control signal characteristic, and therefore greater dynamic range, limiter 28a is provided to cause the control signal output of mixer 30a to be approximately linear over a wide dynamic range. Therefore, as the power level of the interfering signal increases the sampled output from amplifier 32 will increase linearly while the output of limiter 28a will be stabilized at a maximum level thereby providing a control signal output from mixer 30a which varies linearly with the amplitude of the interfering signal.

There is also provided in adaptive filter 10 a second adaptive loop which may be connected by closing switches 14b and 36b. It will be evident from FIG. 1 that the second adaptive loop is similar in form and in operation to the first adaptive loop described above. When both adaptive loops are connected by closing all switches shown, a single interfering signal will be canceled by operation of either one or both of the adaptive loops in the circuit. Which particular adaptive loop will operate is generally the result of fine variations in the circuitry, for example, the gain of each of the loops, the time constant which is controlled by integrating circuits 34 and the phase of the output and delayed replica signal provided to mixers 30. When there are present two narrow-band interfering signals, both adaptive loops will be activated and both signals will be canceled. When no interfering signal is present, there is no correlation of signals in mixers 30 and the control signal output from mixers 30 consists of wideband noise, which is removed by integrating circuits 34; and, therefore, little or no power is supplied in the control circuit to mixer 26. In this case the adaptive loops are effectively shut off.

Figure 2D:
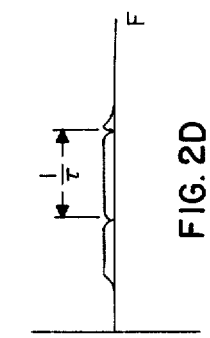

FIG. 2D shows the output signal of amplifier 32 which would be provided to signal processing means 33 when composite signal of FIG. 2C is supplied to input port 12. It will be observed that the adaptive filter 10 has caused there to be a notch in the spectrum of the input signal at the frequency of the narrow-band interfering signal, thereby removing a portion of the desired wideband signal as well as the interfering narrow-band signal. There is also a notch in the desired wideband signal at a frequency which is separated from the frequency of the narrow-band interfering signal by the inverse of the delay time of the delay line 16a. Since the information provided in the desired wideband signal is spread over the entire frequency band L, these notches in the spectrum of the signal supplied to signal processing means 33 do not significantly interfere with the reception of the desired information. It will be recognized that because the filtering notch provided by adaptive filter 10 is provided in response to the interfering narrow-band signal, the filtering notch will change in accordance with changes in the narrow-band signal and will totally disappear when the narrow-band signal ceases to be present.

Figure 3D:
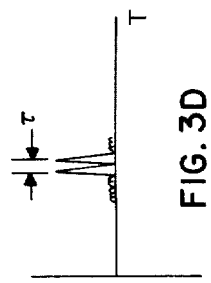

Since the desired wideband signal is supplied to the signal processing means 33 directly and by the adaptive loop which includes delay means 16a, when there is activation of the adaptive loop by the presence of an interfering signal, there will be provided two wideband signals at the input of signal processing means 33 which are separated in time by the delay $\tau$ and therefore there will be two pulse-type outputs of signal processing means 33 as illustrated by the two pulses in FIG. 3D separated in time by the delay $\tau$.

In a case where the signal supplied to input 12 has two narrow-band interfering signals and both adaptive loops of adaptive filter 10 are connected, each of the adaptive loops will independently tend to cancel one of the narrow-band interfering signals. In this case there will be a notch or notches in the spectrum of the output of amplifier 32 associated with each of the interfering narrow-band signals. There will also be a pulse type signal output from processing means 33 associated with the undelayed input signal and each of the two delayed signals coupled to summing circuit 22 by each of the adaptive loops.

DESCRIPTION OF THE EMBODIMENTS OF FIGS. 4 AND 6

Figure 4:
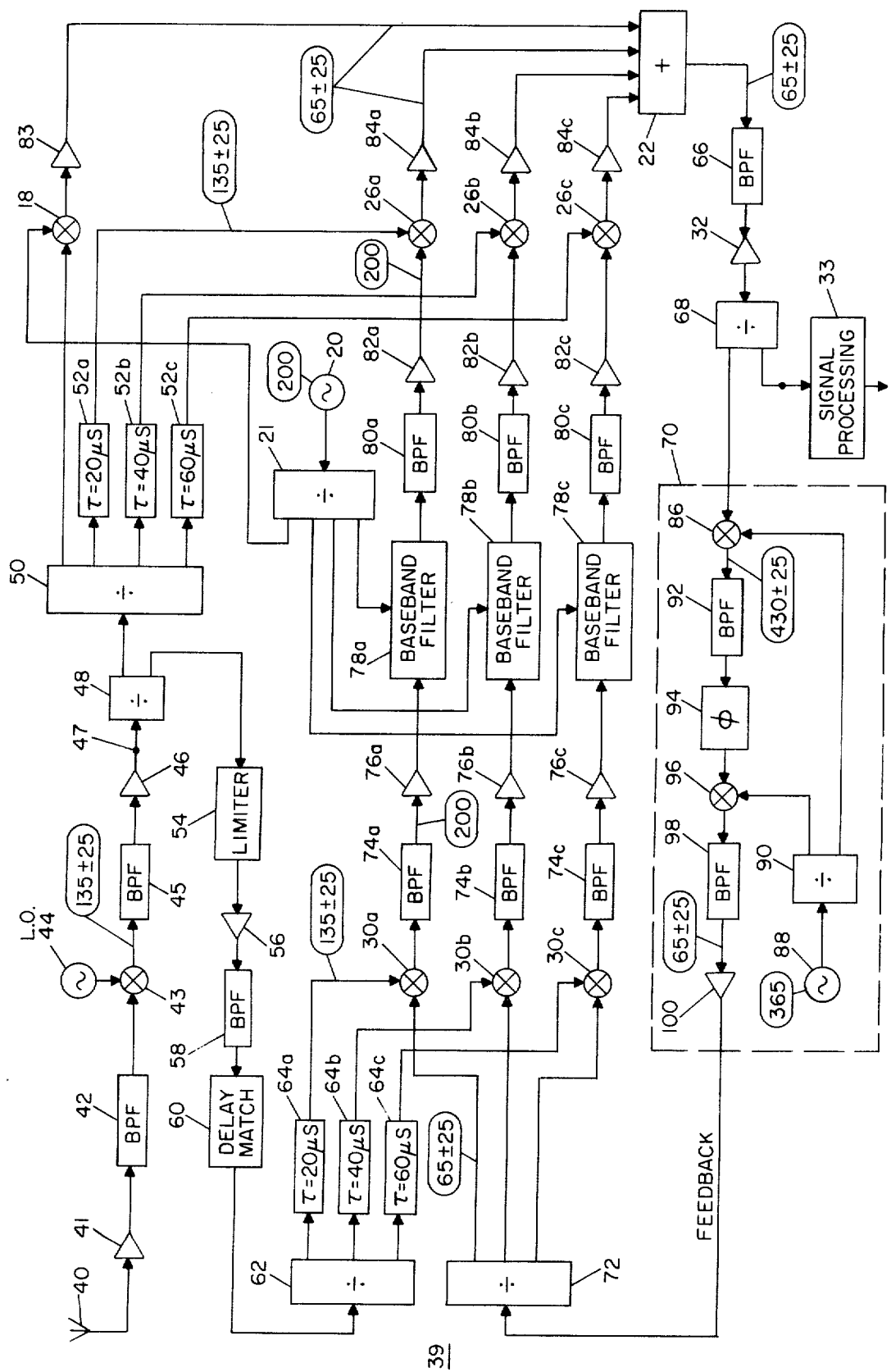
FIG. 4 is a detailed block diagram of another embodiment of the present invention.

FIG. 4 is a more detailed block diagram of another embodiment of the present invention. The FIG. 4 embodiment shows a complete receiving and processing system 39 incorporating an adaptive filter in accordance with the present invention. Processing system 39 includes a receiving antenna 40, low noise amplifier 41, and band pass filter 42 for processing the received signal at the carrier frequency. There is also illustrated mixer 45 and local oscillator 44 for converting the received signal to a convenient IF frequency. In receiving system 39 the first IF frequency illustrated is 135 ± 25 MHz. Those skilled in the art will recognize that this may be either a first or second IF stage and other components may be included which have not been illustrated. To facilitate the explanation of receiving system 39 frequencies and bandwidths of the signals present in the various portions of the system have been indicated by a number encircled in an oval. All of the frequencies indicated in FIG. 4 are in MHz. In the receiving apparatus 39 it has been assumed that the desired signal has a 50 MHz bandwidth and therefore the received signal following the first IF conversion in mixer 45 is indicated as having a frequency of 135 MHz ± 25 MHz. Following conversion in mixer 43 there is illustrated a standard IF band pass filter 45 and IF amplifier 46 which supply the received signal to input terminal 47 of the adaptive filter portion of the signal receiving apparatus 39.

The IF signal from terminal 47 is supplied by signal splitter 48 to signal splitter 50 and limiter 54. Signal splitter 50 has four outputs, three of which are coupled to delay means 52a, 52b and 52c. The remaining output of signal splitter 50 is supplied to mixer 18.

The output of signal splitter 48 which is supplied to limiter 54 is thereafter supplied to signal splitter 62 by amplifier 56, band pass filter 58 and delay matching means 60. Signal splitter 60 has three outputs which are supplied to time delay means 64a, 64b and 64c. As indicated in FIG. 4 delay means 64a has a delay of 20 microseconds which is equal to the delay of delay means 52a. Likewise, delay means 64b and 52b have an equal delay of 40 microseconds and delay means 52c and 64c have an equal delay of 60 microseconds. Delay match means 60 is provided to equalize the delay of signals reaching mixer 30a, at which signal correlation takes place, by two diverse paths. The first path is the path taken by the signal which is to be used for comparison, that is, by way of limiter 54, power splitter 62 and delay means 64a. The second path is the path taken by the feedback signal which is via signal splitter 50, time delay 52a, mixer 26a, amplifier 84a, summing circuit 22, splitter 68, phase shifting circuit 70 and power divider 72, as well as other intermediate components.

In the receiving apparatus 39 there is provided a combining circuit 22 for combining supplied signals to form an output signal. One of the signals supplied to combining circuit 22 comprises the signal supplied to the adaptive filter by terminal 47, signal splitter 48, signal splitter 50, converted in mixer 18 and amplified in amplifier 53. The remaining three inputs to combiner circuit 22 are provided by the three illustrated adaptive loops, having components with number designations a, b and c. The output of summing circuit 22 is supplied to splitting circuit 68 by band pass filter 66 and amplifier 32. One of the outputs of signal splitter 68 is supplied to signal processing circuit 33 to form the desired output signal. The other output of signal splitting means 68 is used as feedback for the three adaptive loops in the adaptive filter in receiving circuit 39 and is supplied by phase shifting circuit 70 to power splitter 72. The output signal has a frequency of 65 ± 25 MHz due to the conversion in mixer 18, which uses the output of local oscillator 20 supplied by power splitter 21 for conversion. The feedback signal which is supplied to power splitter 72 has the identical intermediate frequency and is thereafter supplied to mixers 30a, 30b and 30c, each in one of the adaptive loops of the receiving system.

Also supplied to mixers 30a, 30b and 30c are delayed replicas of the received signal provided at the outputs of time delayed means 64a, 64b and 64c. It will be evident from the diagram that in receiving circuit 39 there are provided three identical adaptive loops and so for reasons of simplicity only one of these will be described in detail. The output of mixer 30a is supplied to base band filter 78a by band pass filter 74a and amplifier 76a. Base band filter 78a is a very narrow band filter and is further described in FIG. 5. As illustrated in FIG. 4 base band filter 78a requires the use of a signal from local oscillator 20 for proper operation. The output of base band filter 78a is a control signal which is supplied by band pass filter 80a and amplifier 82a to mixer 26a. Also supplied to mixer 26a is a delayed replica of the received signal provided at the output of delay means 52a. The combination of these signals in mixer 26a causes an output correction signal which is at the same frequency as the output signal of mixer 18 to be supplied to combining means 22 by amplifier 84a.

Illustrated in detail in FIG. 4 is phase shifting circuit 70. Phase shifting circuit 70 utilizes mixer 86 which is supplied by local oscillator 88 via power splitter 90 to convert the feedback signal from and IF frequency of 65 MHz to an IF frequency of 430 MHz. This conversion is required to facilitate phase shifting of the relatively broadband feedback signal. Following filtering in band pass filter 92 the 430 MHz signal may be conveniently phase shifted by phase shifter 94 and then converted back to a 65 MHz signal in mixer 96. Filtering and amplification are provided by filter 98 and amplifier 100 to provide a clean phase shifted signal having a center frequency of 65 MHz. This phase shifting circuit is used to fine trim the phase of the feedback signal supplied to mixer 30a so that it is equal to the phase of the sampled signal supplied to mixer 30a via limiter 54 and signal splitter 62. In tuning the receiving system 39, gross errors in delay caused by the different signal paths would be accommodated in delay matching means 60 while fine trim of phase would be achieved by phase shifting circuit 70.

Figure 5:
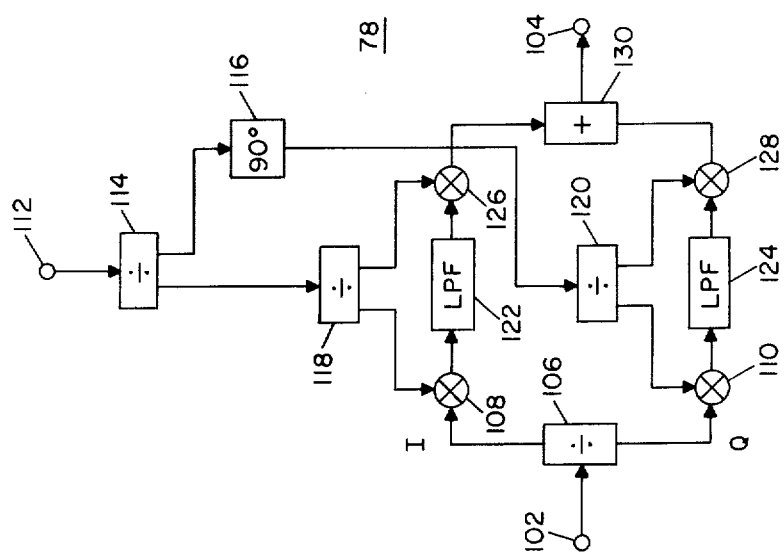
FIG. 5 is a detailed diagram of the base band filter utilized in the FIG. 4 embodiment.

FIG. 5 illustrates a detailed block diagram of base band filter 78 which is used in all of the adaptive loops of receiving circuit 39. The purpose of base band filter 78 is to provide a very narrow band filtering operation with a Q approaching 50,000. This filtering operation is desirable as an integrating operation in the adaptive loop. The general operation of base band filter 78 is to convert the 200 MHz signal which is the output of mixer 30 to a base band video signal, filter the base band video signal, and reconvert the signal to a 200 MHz IF. In order to achieve proper output from the base band filter it is necessary to preserve both the in-phase and quadrature phase signal components. Illustrated in FIG. 5 is base band filter 78 having three terminals. Terminal 102 is the input terminal for the signal to undergo filtering and terminal 104 is the signal output terminal. There is also provided terminal 112 to which is supplied a 200 MHz local oscillator signal. By use of signal splitter 114 and phase shifter 116 there is provided an in-phase component of the local oscillator signal to power splitter 118 and thereafter to mixers 108 and 126. There is also provided a quadrature phase component of the local oscillator signal to power splitter 120 and thereafter to mixers 110 and 128. The intermediate frequency signal to be filtered is supplied to signal splitter 106 from terminal 102 and thence to mixers 108 and 110. The output of mixer 108 is a base band video signal representative of the in-phase components of the signal supplied to input terminal 102. The output of mixer 110 is a base band video signal representative of the quadrature phase components of the signal supplied to terminal 102. The in-phase and quadrature phase base band signals are filtered by low-pass filters 122 and 124 and supplied to mixers 126 and 128. Low-pass filters 122 and 124 are selected to have a band pass commensurate with the desired response time of the adaptive loop. The lower the band pass of the filter, the slower will be the response of the adaptive loop. The outputs of low-pass filters 122 and 124 are video signals which may be used to directly control the phase and amplitude of the delayed replica of the received signal as described below. It has been found however to be more convenient to convert the outputs of low-pass filters 122 and 124 back to the 200 MHz IF signal and control the amplitude and phase of the delayed replica of the received signal by mixing this 200 MHz IF signal with the delayed replica in mixer 26. The IF signal is reconstructed by use of mixers 126 and 128 and summing circuit 130 to provide a 200 MHz IF signal to the output 104 of base band filter 78 to be eventually supplied to mixer 26.

Those skilled in the art will recognize that the operation of receiving circuit 39 is very similar to the operation of adaptive filter 10 illustrated in FIG. 1. In receiving circuit 39, the received signal at terminal 47 is supplied directly to summing circuit 22 by mixer 18 after conversion using local oscillator 20. The signal is also supplied to summing circuit 22 by delay lines 52a, 52b and 52c after frequency conversion in mixers 26a, 26b, and 26c. The frequency conversions in mixers 26a, 26b and 26c includes an adjustment of amplitude and phase of the outputs of the delay lines 52 in accordance with the conditions of the three adaptive loops. The output of combining means 22 is supplied to signal processing means 33 and also supplied to mixers 30a, 30b and 30c for correlation with delayed replicas of the received signal provided by delay lines 64. It will be recognized that a basic difference between the adaptive filter included in receiving circuit 39 and adaptive filter 10 is that only a single limiter 54 is provided and there are provided separate delays for the signal supplied to mixer 26 and the signal supplied to mixer 30. This arrangement is often convenient because limiter 54 must be very linear in phase and may therefore be considerably expensive. By using two sets of delay means 52 and 64 it is possible to use only a single limiter 54. As in the adaptive filter 10 illustrated in FIG. 1 a delayed replica of the received signal is mixed with the output signal of combining means 22 in mixer 30. When a narrow-band signal is present in the desired signal band there is a correlation of the output signal and the delayed signal, resulting in the generation of a constant frequency, 200 MHz IF control signal, which is used in mixer 26a to provide phase and amplitude control of the delayed replica of the received signal to generate a correction signal for use in canceling the interfering narrow-band signal.

Figure 6:
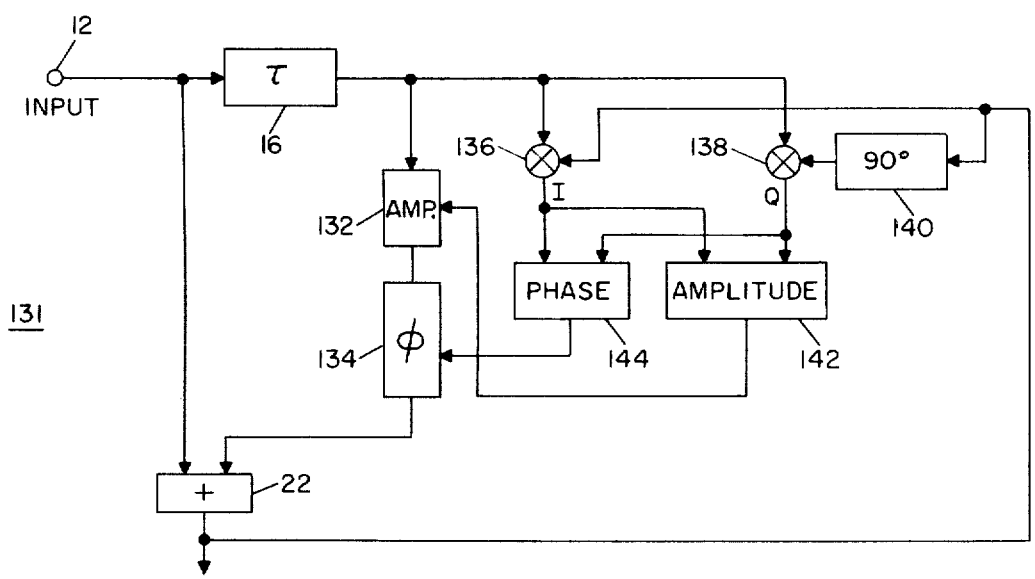
FIG. 6 is still another embodiment of the present invention.

Illustrated in FIG. 6 is a simplified block diagram of another embodiment of the present invention. The embodiment of FIG. 6 shows a technique of implementing the invention without the use of IF conversion. Illustrated in FIG. 6 is adaptive filter 131 which may be operated at either an IF or a carrier frequency. In adaptive filter 131 the orginally supplied signal is directly connected from input 12 to combining means 22 without frequency conversion. The signal is also supplied to delay means 16 to form a delayed replica of the supplied signal. The delayed replica is supplied to mixers 136 and 138 and also to amplitude control device 132. The delayed replica is supplied to combining means 22 by amplitude control device 132 and phase control device 134. It will be recognized that proper adjustment of the amplitude and phase control devices will enable adjustment of the amplitude and phase of the delayed replica to effect the cancellation of interfering narrow-band signals in the output of combiner 22.

Amplitude and phase control devices 132 and 134 are supplied with control signals to achieve adjustment of the amplitude and phase. In mixer 136 the delayed replica supplied by delay means 16 is mixed with the output of combiner 22 to form a base band video signal representative of the in-phase components of the output signal with respect to the delayed replica supplied by delay means 16. The output of combiner 22 is supplied to mixer 138 by 90° phase shifter 140. In mixer 138 there is generated a base band video signal representative of the quadrature components of the output signal with respect to the delayed replica supplied by delay means 16. The in-phase and quadrature video signals generated in mixers 136 and 138 represent error signals resulting from the presence of narrow-band components in the signal supplied to input 12. There is provided circuitry 142 and 144, which may be either digital or analog, to effect a coordinate conversion of the in-phase and quadrature error signals into signals representative of the amplitude and phase of the output signal with respect to the delay replica.

The amplitude component of the control signal is determined by taking the square root of the sum of the squares of the in-phase and quadrature signal components. The phase component is determined by the ratio of the in-phase component to the quadrature component and the polarity of the respective signals. The amplitude and phase representative control signals are then supplied to amplitude and phase control devices 132 and 134 to achieve control of the delayed replica and thereby generate a correction signal to be supplied to combiner 22.

Alternative to the arrangement illustrated in FIG. 6, amplitude and phase control of the delayed replica may be achieved by forming quadrature components of the delayed replica and using the in-phase and quadrature control signals to directly control the amount of each of the delayed replica components supplied to combiner 22.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An adaptive filter for suppressing an interfering narrow-band signal in a composite signal containing a desired broad-band signal, comprising:
   means, responsive to supplied signals, for combining said signals to form an output signal;
   means for supplying said composite signal to said combining means;
   means, responsive to said composite signal, for providing a delayed replica of said composite signal;
   and means, jointly responsive to said delayed replica and to said output signal, for developing a correction signal and for supplying said correction signal to said combining means to cause suppression of said interfering narrow-band signal in said output signal.

2. An adaptive filter as specified in claim 1 wherein said means for developing a correction signal comprises:
   means, responsive to said delayed replica and to said output signal, for developing a control signal;
   means, jointly responsive to said delayed replica and to said control signal, for controlling the amplitude and phase of said delayed replica, thereby to develop said correction signal;
   and means for supplying said correction signal to said combining means.

3. An adaptive filter as specified in claim 2 wherein said means for developing said control signal includes means for limiting the amplitude of said delayed replica and means, jointly responsive to said output signal and to said limited delayed replica, for developing said control signal.

4. An adaptive filter as specified in claim 3 wherein said means for developing said control signal includes a mixer for combining said output signal with said limited delayed replica, and a filter connected to the output of said mixer.

5. An adaptive filter as specified in claim 1 wherein said means for supplying said composite signal to said combining means includes means for converting the frequency of said composite signal.

6. An adaptive filter as specified in claim 1 wherein said means for supplying a delayed replica of said composite signal comprises means for providing a delay having a period greater than the inverse of the frequency bandwidth of said desired broad-band signal.

7. An adaptive filter as specified in claim 1 wherein there are a plurality of said means for developing delayed replicas of said composite signal, each of said means for developing a delayed replica having a different period of delay, and there are a plurality of said means for developing correction signals, each responsive to one of said delayed replicas, and each for supplying a correction signal to said combining means, thereby causing suppression of a plurality of said interfering narrow-band signals in said output signal.

8. An adaptive filter for suppressing an interfering narrow-band signal in a composite signal containing a desired broad-band signal, comprising:

means, responsive to supplied signals, for combining said signals to form an output signal;

means, including a local oscillator, for converting the frequency of said composite signal and supplying said frequency converted composite signal to said output means;

means, responsive to said composite signal, for providing a delayed replica of said composite signal, said means having a delay period greater than the inverse of the bandwidth of said desired broad-band signal;

means, responsive to said delayed replica, for limiting the amplitude of said delayed replica;

means, responsive to said amplitude limited delayed replica and to said output signal, for providing a control signal having a frequency substantially equal to the frequency of said local oscillator;

means, responsive to said control signal and to said delayed replica, for controlling the amplitude and phase of said delayed replica and for converting the frequency of said delayed replica thereby providing a correction signal;

and means for supplying said correction signal to said combining means to cause suppression of said interfering narrow-band signal in said output signal.

* * * * *